(12) United States Patent
Jacob et al.

(10) Patent No.: US 9,897,105 B2
(45) Date of Patent: Feb. 20, 2018

(54) COMPRESSOR

(71) Applicant: Dyson Technology Limited, Wiltshire (GB)

(72) Inventors: Paul Adrian Graham Jacob, Uxbridge (GB); Gary King, Caerphilly (GB); David Franz Lakin, Cheltenham (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 607 days.

(21) Appl. No.: 14/268,778

(22) Filed: May 2, 2014

(65) Prior Publication Data
US 2014/0328674 A1  Nov. 6, 2014

(30) Foreign Application Priority Data

May 3, 2013 (GB) .................................. 1308093.2

(51) Int. Cl.
| | |
|---|---|
| *F04D 29/58* | (2006.01) |
| *F16C 41/00* | (2006.01) |
| *F04D 29/059* | (2006.01) |
| *F04D 29/62* | (2006.01) |

(52) U.S. Cl.
CPC ....... *F04D 29/5853* (2013.01); *F04D 29/059* (2013.01); *F04D 29/584* (2013.01); *F04D 29/624* (2013.01); *F16C 41/004* (2013.01); *Y10T 29/49245* (2015.01)

(58) Field of Classification Search
CPC .. F04D 29/5853; F04D 29/059; F04D 29/584; F04D 29/624; F16C 41/004; Y10T 29/49245

USPC ..................... 415/177–180, 229; 29/888.025
See application file for complete search history.

(56) References Cited

U.S. PATENT DOCUMENTS

| | | | |
|---|---|---|---|
| 3,961,199 A | | 6/1976 | Bronicki |
| 4,725,206 A | * | 2/1988 | Glaser ................... F01D 25/125 |
| | | | 415/175 |
| 5,087,176 A | | 2/1992 | Wieland |
| 5,427,498 A | | 6/1995 | Lehe et al. |
| 5,904,471 A | | 5/1999 | Woollenweber et al. |
| 6,129,524 A | | 10/2000 | Woollenweber et al. |
| 6,293,769 B1 | | 9/2001 | Radermacher et al. |
| 6,617,747 B1 | | 9/2003 | Petersen |
| 7,267,523 B2 | * | 9/2007 | Saville ...................... F01D 5/02 |
| | | | 384/317 |

(Continued)

FOREIGN PATENT DOCUMENTS

| | | |
|---|---|---|
| DE | 102 38 527 | 3/2004 |
| EP | 2 562 426 | 2/2013 |

(Continued)

OTHER PUBLICATIONS

International Search Report and Written Opinion dated Jul. 24, 2014, directed to International Application No. PCT/GB2014/051294, 9 pages.

(Continued)

*Primary Examiner* — Hoang Nguyen
(74) *Attorney, Agent, or Firm* — Morrison & Foerster LLP (57) ABSTRACT

A compressor that includes a rotor assembly, a stator assembly and a heat sink assembly. The rotor assembly includes a shaft to which a bearing assembly and a rotor core are secured. The heat sink assembly is then secured to the bearing assembly and to the stator assembly.

22 Claims, 8 Drawing Sheets

(56) References Cited

U.S. PATENT DOCUMENTS

| | | | |
|---|---|---|---|
| 7,530,230 | B2 | 5/2009 | Shibui et al. |
| 7,673,452 | B2 | 3/2010 | Shimizu |
| 7,802,429 | B2 | 9/2010 | Yokoyama et al. |
| 7,988,426 | B2 | 8/2011 | Elpern et al. |
| 8,636,479 | B2 | 1/2014 | Kenyon et al. |
| 2006/0250039 | A1 | 11/2006 | Yamamoto |
| 2007/0269323 | A1 | 11/2007 | Zhou et al. |
| 2008/0084140 | A1 | 4/2008 | Kim |
| 2010/0215485 | A1 | 8/2010 | Childe et al. |
| 2010/0215491 | A1* | 8/2010 | Mockridge ......... F04D 29/0563 415/229 |
| 2010/0287958 | A1* | 11/2010 | Telakowski ............. F04D 17/12 62/56 |
| 2012/0321455 | A1 | 12/2012 | Boening et al. |
| 2013/0051983 | A1 | 2/2013 | Clothier et al. |
| 2013/0052019 | A1 | 2/2013 | Ions et al. |
| 2014/0328674 | A1 | 11/2014 | Jacob et al. |
| 2014/0328684 | A1 | 11/2014 | King et al. |
| 2015/0337850 | A1 | 11/2015 | An et al. |

FOREIGN PATENT DOCUMENTS

| | | |
|---|---|---|
| GB | 2467964 | 8/2010 |
| GB | 2467966 | 8/2010 |
| JP | 05-288195 | 11/1993 |
| JP | 6-335202 | 12/1994 |
| JP | 8-93684 | 4/1996 |
| JP | 2005-163757 | 6/2005 |
| JP | 2005-532026 | 10/2005 |
| JP | 2006-322451 | 11/2006 |
| JP | 2007-278182 | 10/2007 |
| JP | 2010-196705 | 9/2010 |
| JP | 2010-196707 | 9/2010 |
| JP | 2011-202588 | 10/2011 |
| JP | 2012-202282 | 10/2012 |
| JP | 2013-46570 | 3/2013 |

OTHER PUBLICATIONS

Search Report dated Aug. 24, 2015, directed to GB Application No. 1514610.3; 1 page.

Search Report dated Nov. 18, 2013, directed to GB Application No. 1308093.2, 2 pages.

King, U.S. Office Action dated Aug. 22, 2016, directed to U.S. Appl. No. 14/268,750; 11.

King, U.S. Office Action dated Aug. 29, 2016, directed to U.S. Appl. No. 14/268,804; 10.

King et al., U.S. Office Action dated Mar. 14, 2017, directed to U.S. Appl. No. 14/268,750; 19 pages.

King et al., U.S. Office Action dated Mar. 14, 2017, directed to U.S. Appl. No. 14/268,804; 16 pages.

King et al., U.S. Office Action dated Aug. 28, 2017, directed to U.S. Appl. No. 14/268,750; 10 pages.

King et al., U.S. Office Action dated Aug. 29, 2017, directed to U.S. Appl. No. 14/268,804; 16 pages.

\* cited by examiner

COMPRESSOR

REFERENCE TO RELATED APPLICATION

This application claims priority of United Kingdom Application No. 1308093.2, filed May 3, 2013, the entire contents of which are incorporated herein by reference.

FIELD OF THE INVENTION

The present invention relates to a compressor.

BACKGROUND OF THE INVENTION

Efforts are continually being made to design compressors of smaller size. A smaller compressor may be achieved by employing a smaller impeller. However, a smaller impeller is required to rotate at higher speeds in order to achieve the same mass flow rates. Higher rotational speeds typically reduce the lifespan of the bearings, which are often the first components of the compressor to fail. Consequently, efforts to design a smaller compressor are often beset with lifespan problems.

SUMMARY OF THE INVENTION

The present invention provides a compressor comprising a rotor assembly, a stator assembly and a heat sink assembly, wherein the rotor assembly comprises a shaft to which a bearing assembly and a rotor core are secured, the heat sink assembly is secured to the bearing assembly and comprises a heat sink having a plurality of legs that extend radially outward, and the stator assembly is secured to one or more of the legs.

The heat sink assembly acts to carry heat away from the bearing assembly. As a result, the lifespan of the bearing assembly and thus the compressor may be prolonged. The heat sink assembly is secured directly to the rotor assembly and to the stator assembly. Accordingly, the heat sink assembly may be used to achieve accurate alignment between the rotor assembly and the stator assembly. In particular, the rotor assembly and the stator assembly may be aligned and then the heat sink assembly may be secured to both assemblies so as to maintain the alignment. The collective subassembly (i.e. the rotor assembly, stator assembly and heat sink assembly) may then be secured within a frame of the compressor whilst maintaining the alignment between the rotor assembly and the stator assembly. With conventional compressors, the rotor assembly and the stator assembly are typically secured to the frame as separate assemblies. Owing to tolerances in the alignment of the rotor assembly and the stator assembly, a larger air gap is required between the rotor core and the stator cores in order to ensure that, at the tolerance limit, the rotor core is free to rotate without contacting the stator cores. By securing both the rotor assembly and the stator assembly to the heat sink assembly, and then securing the subassembly within the frame, a smaller air gap may be achieved between the rotor core and the stator assembly. Moreover, when securing the subassembly to the frame, the rotor assembly may be aligned relative to other components of the compressor (e.g. diffuser or shroud) whilst maintaining the alignment between the rotor assembly and the stator assembly. Accordingly, the electromagnetic performance of the compressor may be improved without sacrificing the aerodynamic performance.

The compressor may be configured such that air flows through the interior of the compressor. By employing a heat sink having legs, the air flowing through the compressor is free to pass between the legs so as to improve cooling of the heat sink and thus the bearing assembly.

The rotor assembly may comprise an impeller secured to the shaft, and the bearing assembly may be located between the impeller and the rotor core. By having the impeller and the rotor core located on opposite sides of the bearing assembly, a relatively compact rotor assembly may be achieved.

The bearing assembly may comprise a pair of bearings, and the heat sink assembly may comprise a sleeve to which the heat sink is secured. The sleeve is then secured to the bearings, and the legs of the heat sink extend radially from the sleeve. The provision of a pair of bearings spaced along the shaft increases the stability of the rotor assembly. Additionally, the bearings and the sleeve increase the stiffness of the rotor assembly. The sleeve also acts to transfer heat from the bearings to the heat sink, as well as to the surrounding air.

The stator assembly may be glued to the heat sink assembly. This then allows the stator assembly to be aligned relative to the rotor core before securing the stator assembly to the heat sink assembly.

The stator assembly may comprise one or more stator cores arranged around the rotor core.

The heat sink assembly may be formed of a metal. Metals typically have a relatively high structural strength and high thermal conductivity. Consequently, the heat sink assembly is able to provide relatively good opposition to movement of the rotor assembly, thereby reducing vibration and noise, as well as provide relatively good cooling of the bearing assembly.

The heat sink assembly may be formed of a material having a coefficient of thermal expansion that substantially matches that of the shaft. Consequently, uneven thermal expansion of the heat sink assembly and the shaft, which might otherwise lead to adverse changes in the loading of the bearing assembly, may be avoided.

The present invention also provides a compressor comprising a rotor assembly, a stator assembly and a heat sink assembly, wherein the rotor assembly comprises a shaft to which a bearing assembly and a rotor core are secured, the bearing assembly comprises a pair of bearings, the heat sink assembly comprises a sleeve to which a heat sink is secured, the heat sink extends radially outward from the sleeve, the sleeve is secured to the bearings, and the stator assembly is secured to the heat sink.

The heat sink assembly acts to carry heat away from the bearing assembly. As a result, the lifespan of the bearing assembly and thus the compressor may be prolonged. The heat sink assembly is secured directly to the rotor assembly and to the stator assembly. Accordingly, the heat sink assembly may be used to achieve accurate alignment between the rotor assembly and the stator assembly. In particular, the rotor assembly and the stator assembly may be aligned and then the heat sink assembly may be secured to both assemblies so as to maintain the alignment. The collective subassembly (i.e. the rotor assembly, stator assembly and heat sink assembly) may then be secured within a frame of the compressor whilst maintaining the alignment between the rotor assembly and the stator assembly. With conventional compressors, the rotor assembly and the stator assembly are typically secured to the frame as separate assemblies. Owing to tolerances in the alignment of the rotor assembly and the stator assembly, a larger air gap is required between the rotor core and the stator cores in order to ensure that, at the tolerance limit, the rotor core is free to rotate without contacting the stator cores. By securing both the rotor assembly and the stator assembly to the heat sink assembly, and then securing the subassembly within the frame, a smaller air gap may be achieved between the rotor core and the stator assembly. Moreover, when securing the subassembly to the frame, the rotor assembly may be aligned relative to other components of the compressor (e.g. diffuser or shroud) whilst maintaining the alignment between the rotor assembly and the stator assembly. Accordingly, the electromagnetic performance of the compressor may be improved without sacrificing the aerodynamic performance.

The provision of a pair of bearings spaced along the shaft increases the stability of the rotor assembly. Additionally, the bearings and the sleeve increase the stiffness of the rotor assembly. The sleeve also acts to transfer heat from the bearings to the heat sink, as well as to the surrounding air.

The compressor may be configured such that air is drawn through the interior of the compressor and flows over the sleeve and the heat sink. By flowing over both the sleeve and the heat sink cooling of the bearing assembly is improved.

The heat sink may comprise a plurality of legs that extend radially from the sleeve, and the stator assembly may be secured to one or more of the legs. By employing a heat sink having legs, air flowing through the compressor is free to pass between the legs so as to improve cooling of the heat sink and thus the bearing assembly.

The rotor assembly may comprise an impeller secured to the shaft, and the bearing assembly may be located between the impeller and the rotor core. By having the impeller and the rotor core located on opposite sides of the bearing assembly, a relatively compact rotor assembly may be achieved.

The stator assembly may be glued to the heat sink assembly. This then allows the stator assembly to be aligned relative to the rotor core before securing the stator assembly to the heat sink assembly.

The stator assembly may comprise one or more stator cores arranged around the rotor core.

The heat sink assembly may be formed of a metal. Metals typically have a relatively high structural strength and high thermal conductivity. Consequently, the heat sink assembly is able to provide relatively good opposition to movement of the rotor assembly, thereby reducing vibration and noise, as well as provide relatively good cooling of the bearing assembly.

The heat sink assembly may be formed of a material having a coefficient of thermal expansion that substantially matches that of the shaft. Consequently, uneven thermal expansion of the heat sink assembly and the shaft, which might otherwise lead to adverse changes in the loading of the bearing assembly, may be avoided.

The present invention further provides a method of assembling a compressor, the method comprising: providing a rotor assembly comprising a shaft to which a bearing assembly and a rotor core are secured; providing a stator assembly; providing a heat sink assembly; securing the heat sink assembly to the bearing assembly; and subsequently securing the heat sink assembly to the stator assembly.

As noted above, by securing the heat sink assembly directly to both the rotor assembly and the stator assembly, a smaller air gap may be employed between the rotor core and the stator assembly. Moreover, the collective subassembly (i.e. the rotor assembly, the stator assembly and the heat sink assembly) may then be secured to a frame of the compressor such that the rotor assembly is aligned relative to other components of the compressor (e.g. diffuser or shroud) whilst maintaining the alignment between the rotor assembly and the stator assembly. Accordingly, the electromagnetic and aerodynamic performance of the compressor may be improved.

The heat sink assembly is secured to the bearing assembly and then subsequently to the stator assembly. This then has the advantage that a relatively tight clearance or fit may be employed between the heat sink assembly and the bearing assembly. In spite of the tight clearance, movement of the stator assembly is unhindered and thus relatively good alignment with the rotor assembly may be achieved before securing the stator assembly to the heat sink assembly. By contrast, if the stator assembly were first secured to the heat sink assembly then, when securing the heat assembly to the rotor assembly, movement of the stator assembly relative to the rotor assembly would be limited due to the tight clearance between heat sink assembly and the rotor assembly, and thus the desired alignment may be difficult or impossible to achieve.

The stator assembly may comprise one or more stator cores, and the heat sink assembly may be secured to the rotor assembly and to the stator assembly such that the stator cores are arranged around the rotor core.

BRIEF DESCRIPTION OF THE DRAWINGS

In order that the present invention may be more readily understood, an embodiment of the invention will now be described, by way of example, with reference to the accompanying drawings, in which.

DETAILED DESCRIPTION OF THE INVENTION

The compressor 1 of FIGS. 1 to 11 comprises a frame 2, a shroud 3, a rotor assembly 4, a heat sink assembly 5, a stator assembly 6, and a circuit assembly 7.

Figure 3:
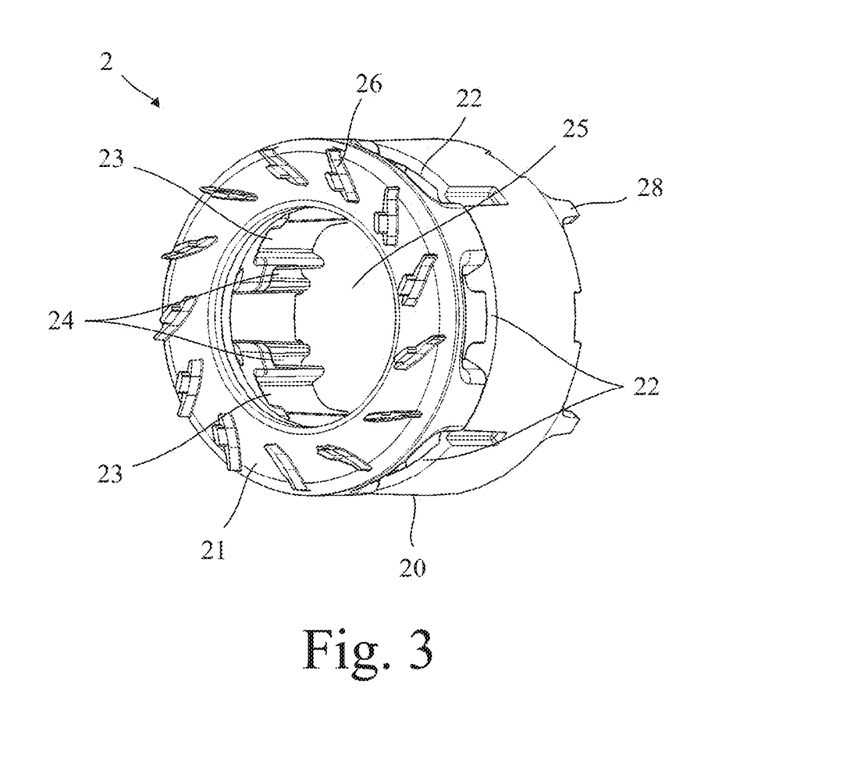
FIG. 3 is a first axonometric view of the frame of the compressor.
Figure 4:
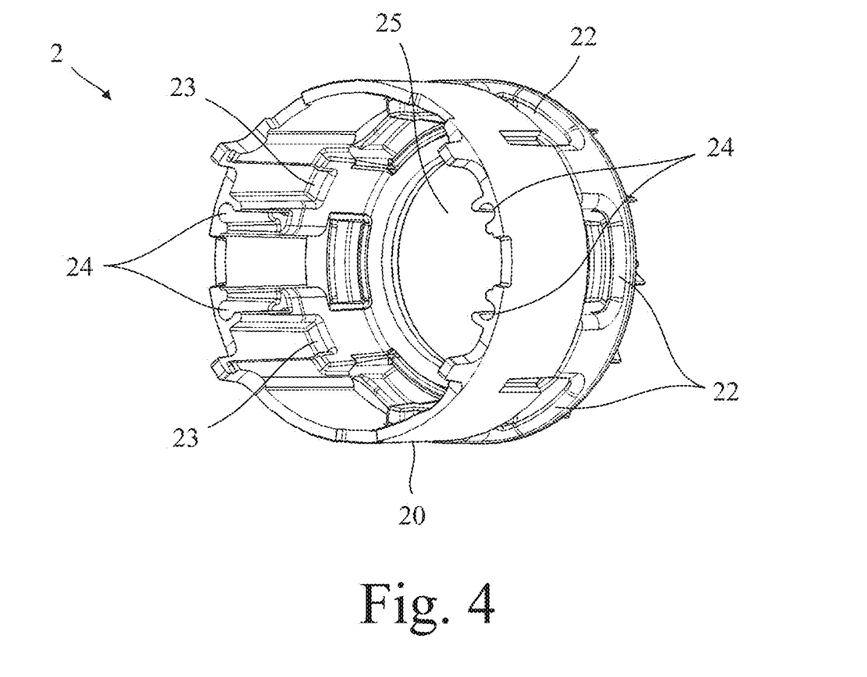
FIG. 4 is a second axonometric view of the frame of the compressor.

The frame 2 is generally cylindrical in shape and comprises a side wall 20, an end wall 21, a plurality of inlet apertures 22 located around the side wall 20, a plurality of pockets 23 and a plurality of channels 24 located on the inside of the side wall 20, a central aperture 25 located in the end wall 21, and a plurality of diffuser vanes 26 located around the end wall 21. The pockets 23 and the channels 24 take the form of recesses that extend axially along the inside of the side wall 20. The recesses are open at one end (distal the end wall 21) and closed at the opposite end (proximal the end wall 21). The end wall 21 is located at one end of the side wall 20 and resembles an annulus around which the diffuser vanes 26 are located. The opposite end of the side wall 20 is open and terminates with a plurality of prongs 28.

Figure 5:
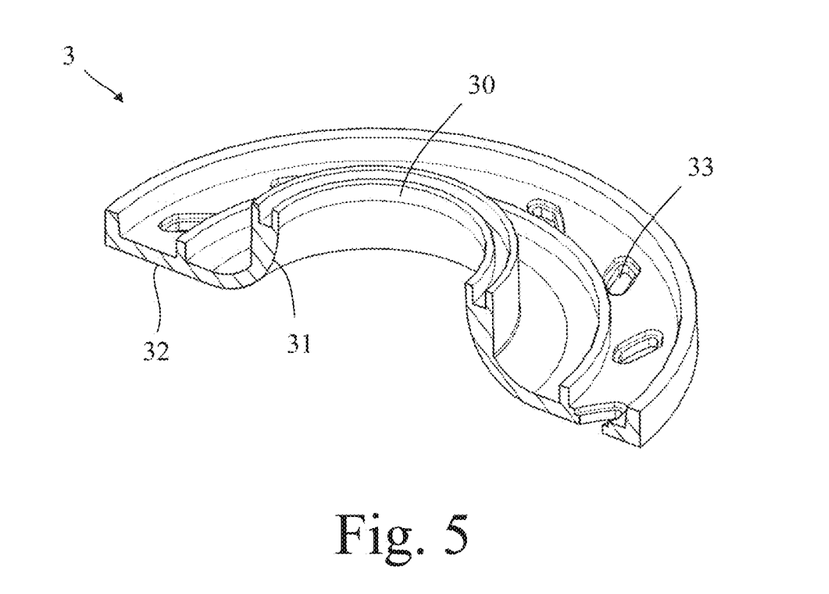
FIG. 5 is an axonometric section through the shroud of the compressor.

The shroud 3 comprises an inlet 30, a flared inner section 31, a planar outer section 32 and a plurality of holes 33 that extend through the outer section 32. The inner section 31 covers the impeller 41 of the rotor assembly 4, and the outer section 32 covers the end wall 11 of the frame 2. Each of the diffuser vanes 26 includes a projection that extends through a respective hole 33 in the shroud 3. A ring of adhesive 34 then secures the shroud 3 to the vanes 26 and seals the holes 33. The shroud 3 and the end wall 21 thus define a diffuser 35 that surrounds the impeller 41.

Figure 6:
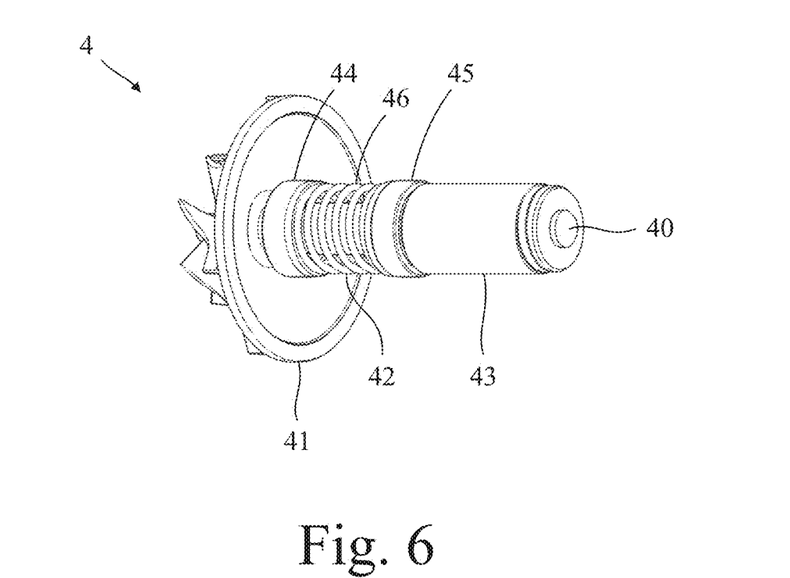
FIG. 6 is an axonometric view of the rotor assembly of the compressor.

The rotor assembly 4 comprises a shaft 40 to which an impeller 41, a bearing assembly 42, and a rotor core 43 are secured. The bearing assembly 42 is located between the impeller 41 and the rotor core 43 and comprises a pair of bearings 44,45 and a spring 46. The spring 46 is located between the two bearings 44,45 and applies a preload to each of the bearings 44,45.

Figure 7:
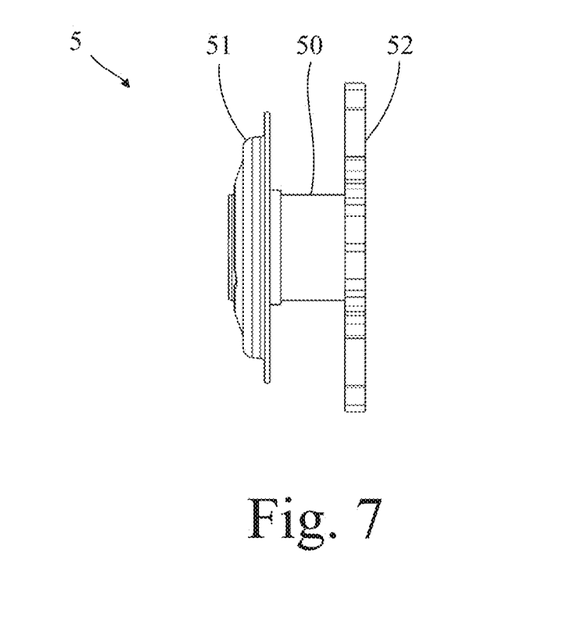
FIG. 7 is a side view of the heat sink assembly of the compressor.
Figure 8:
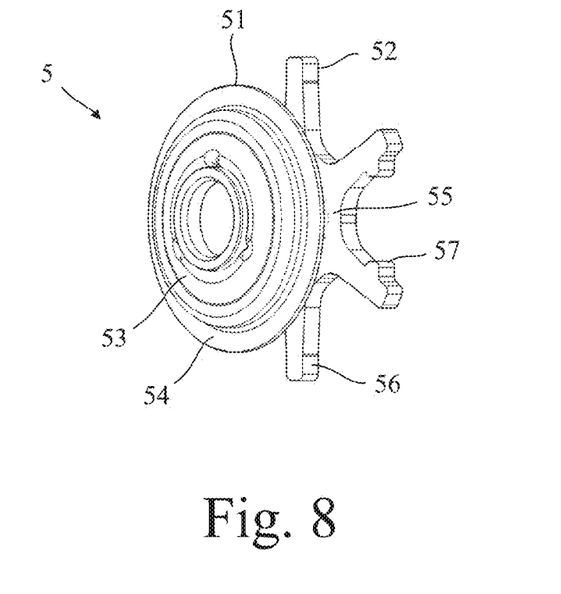
FIG. 8 is a first axonometric view of the heat sink assembly.
Figure 9:
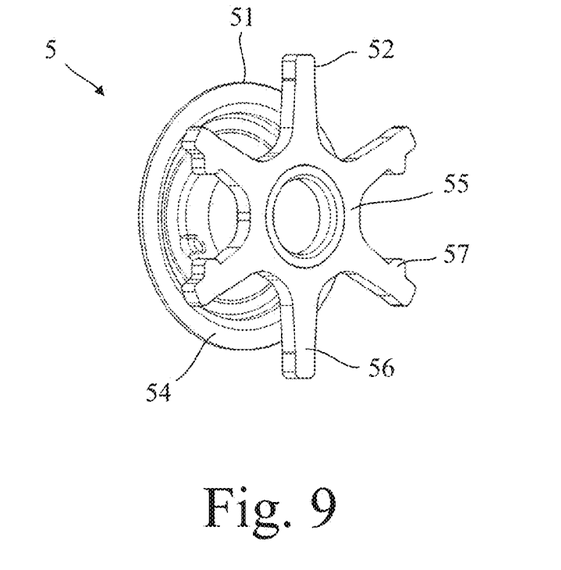
FIG. 9 is a second axonometric view of the heat sink assembly.

The heat sink assembly 5 comprises a cylindrical sleeve 50, a first heat sink 51 secured to the sleeve 50 at one end, and a second heat sink 52 secured to the sleeve 50 at the opposite end. The first heat sink 51 is generally disc shaped and comprises a raised, dome-shaped centre 53 and a flat outer flange 54. The second heat sink 52 resembles the rowel of a spur and comprises a central hub 55 from which a plurality of legs 56 extend radially outward. The legs 56 are spaced evenly around the hub 55. That is to say that the angle between adjacent legs 56 is the same for all legs 56 of the heat sink 52. In the present embodiment, the heat sink 52 has six legs 56 spaced apart by 60 degrees. The width of each leg 56 tapers (i.e. decreases gradually) in a direction away from the hub 55.

The heat sink assembly 5 is secured to the rotor assembly 4. More specifically, the sleeve 50 surrounds both bearings 44,45 and is secured to each of the bearings 44,45 by an adhesive. The underside of the impeller 41 is recessed, which helps reduce the mass of the impeller 41. The heat sink assembly 5 is then secured to the rotor assembly 4 such that the dome-shaped centre 53 of the first heat sink 51 projects into the underside of the impeller 41. This then reduces the size of the cavity beneath the impeller 41. As a result, windage and/or other parasitic losses are reduced.

Figure 10:
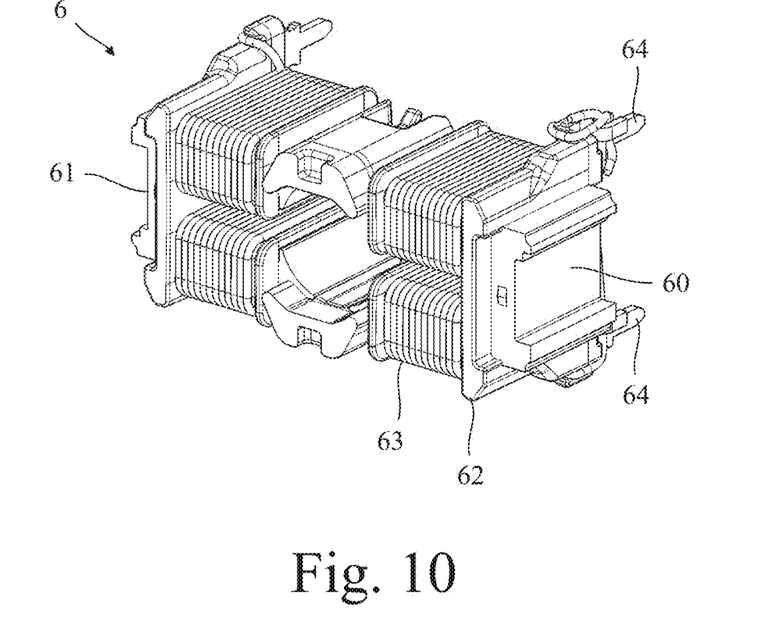
FIG. 10 is an axonometric view of the stator assembly of the compressor.

The stator assembly 6 comprises a pair of stator cores 60,61, each stator core comprising a bobbin 62 around which electrical windings 63 are wound and a pair of terminal connectors 64 connected to the windings 63. The stator assembly 6 is secured to the heat sink assembly 5. Each bobbin 62 is secured to two legs 56 of the second heat sink 52 by an adhesive. The glue points of the bobbins 62 do not align perfectly with the legs 56 of the heat sink 52. Accordingly, each of the four legs 56 to which the stator assembly 6 is secured includes a small bump 57 which serves as an anchor for the adhesive between the bobbin 62 and the heat sink 52.

Figure 11:
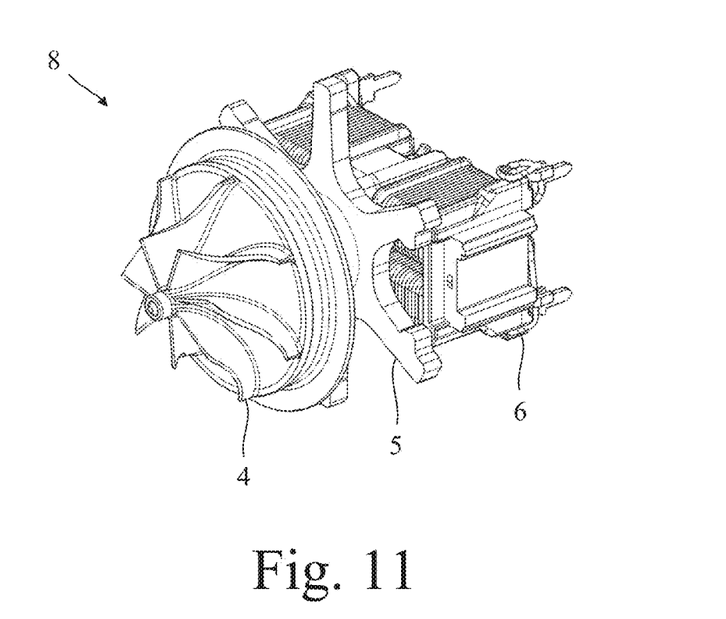
FIG. 11 is an axonometric view of a subassembly of the compressor.

The subassembly 8 comprising the rotor assembly 4, the heat sink assembly 5 and the stator assembly 6 is secured within the frame 2. The outer flange 54 of the first heat sink 51 is secured to the end wall 21 of the frame 2 by a ring of adhesive. Each of the legs 56 of the second heat sink 52 is secured within a respective pocket 23 by beads of adhesive. Finally, the corners of the stator cores 60,61 are secured to the frame 2 by adhesive located within the channels 24. The subassembly 8 is therefore secured to the frame 2 around the outer flange 54 of the first heat sink 51, at the ends of the legs 56 of the second heat sink 52, and at the corners of the stator cores 60,61.

Figure 1:
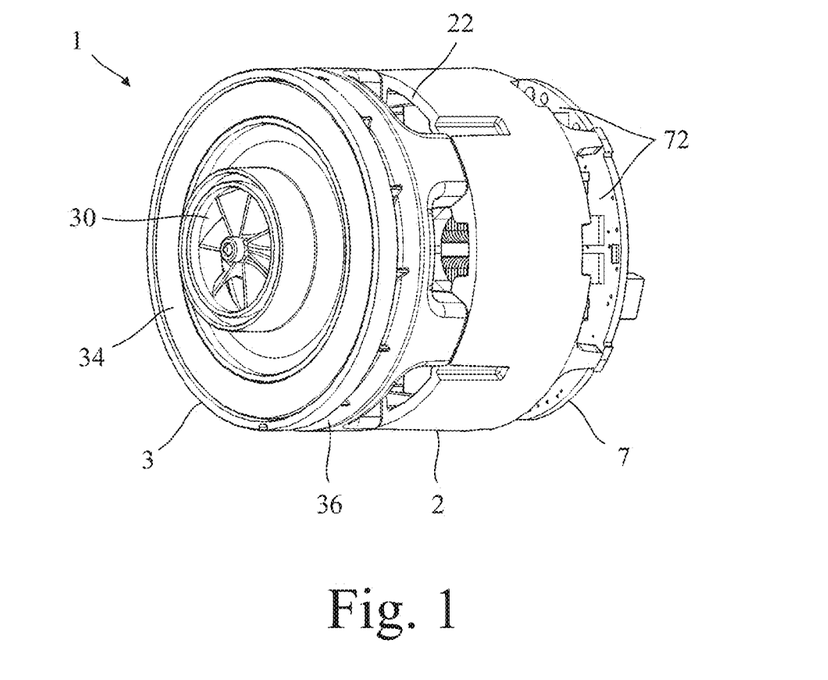
FIG. 1 is an axonometric view of a compressor in accordance with the present invention.
Figure 2:
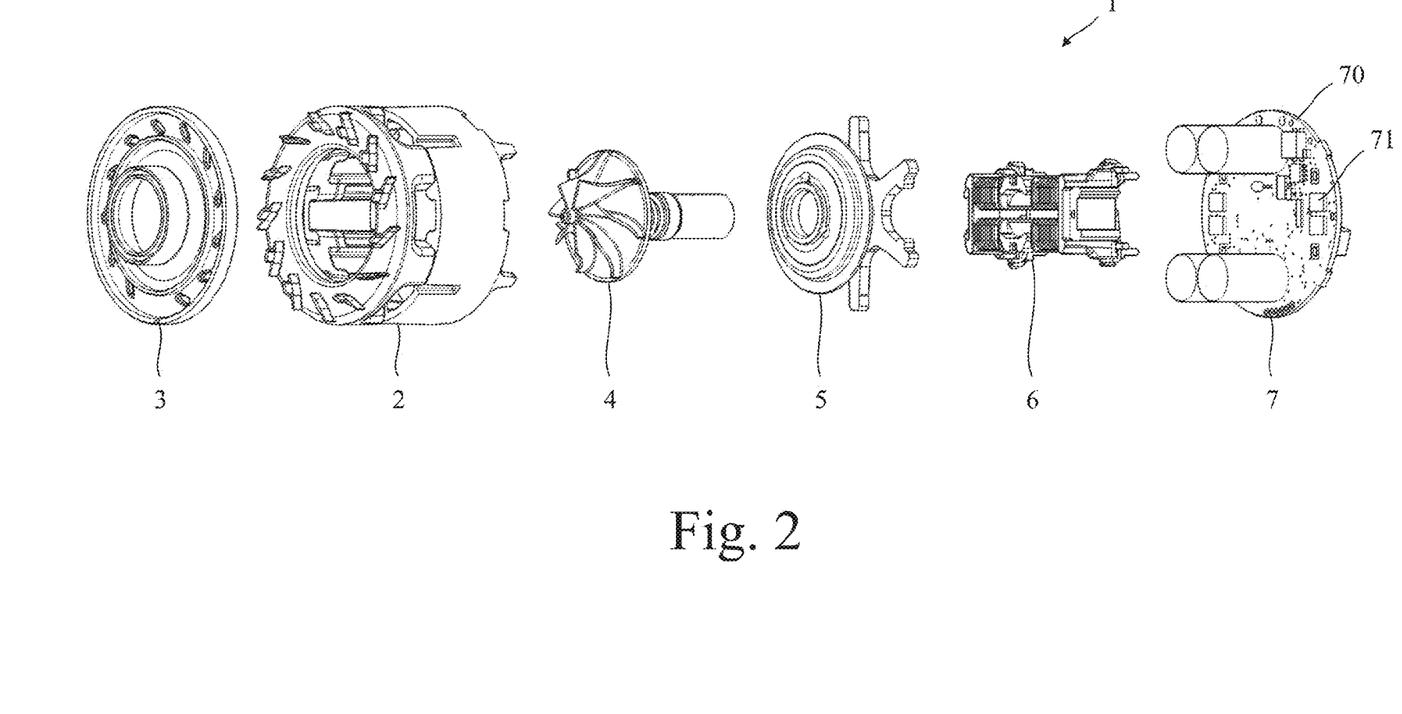
FIG. 2 is an exploded view of the compressor.

The circuit assembly 7 comprises a circuit board 70 on which electronic components 71 for controlling the operation of the compressor 1 are mounted. The circuit assembly 7 is secured to the frame 2 and to the stator assembly 6. More specifically, the circuit board 60 is secured to the prongs 28 of the frame 2 by an adhesive, and the terminal connectors 64 of the stator assembly 6 are soldered to the circuit board 70.

A method of assembling the compressor 1 will now be described.

The heat sink assembly 5 is first secured to the rotor assembly 4. This is achieved by applying a ring of adhesive around the bearing 44 proximal the impeller 41, applying a ring of activator around the inside of the sleeve 50 at the end adjacent the first heat sink 51, and applying a further ring of adhesive around the inside of the sleeve 50 at the end adjacent the second heat sink 52. The rotor assembly 4 is then inserted into the sleeve 50 until the sleeve 50 surrounds both bearings 44,45. The activator within the sleeve 50 causes the adhesive around the bearing 44 adjacent the impeller 41 to cure. UV light is then used to cure the adhesive around the bearing 45 adjacent the rotor core 43. The net result is that the sleeve 50 is adhered to both bearings 44,45.

The stator assembly 6 is then secured to the heat sink assembly 5. This is achieved by mounting the stator assembly 6 within one part of a jig, and mounting the rotor-heat sink assembly 4,5 in another part of the jig. The jig ensures relative alignment between the rotor assembly 4 and the stator assembly 6, and more specifically between the rotor core 43 and the stator cores 60,61. Two small beads of adhesive are then applied to each of the bobbins 62, and the two parts of the jig are brought together such that the bobbins 62 contacts the legs 56 of the second heat sink 52. The adhesive is then cured using UV light.

The subassembly 8 comprising the rotor assembly 4, the heat sink assembly 5 and the stator assembly 6 is then secured to the frame 2. The subassembly 8 is mounted within one part of a jig and the frame 2 is mounted in another part. The jig ensures relative alignment between the rotor assembly 4 and the frame 2, and more specifically between the impeller 41 and the end wall 21 on which the diffuser vanes 26 are located. A ring of heat-curable adhesive is then applied to the inner surface of the end wall 11 of the frame 2. Beads of heat-curable adhesive are also applied to each of the pockets 23 of the frame 2. The two parts of the jig are then brought together, causing the subassembly 8 to be inserted into the frame 2 via the open end. The outer diameter of the first heat sink 51 is greater than that of the impeller 41, and thus the outer flange 54 of the heat sink 51 extends radially beyond the impeller 41. The diameter of the central aperture 25 in the end wall 21 of the frame 2 is greater than that of the impeller 41 but smaller than that of the first heat sink 51. As the two parts of the jig are brought together, the impeller 41 passes through the central aperture 25. The outer flange 54 of the first heat sink 51 then contacts the ring of adhesive formed around the end wall 21. Additionally, each of the legs 56 of the second heat sink 52 slot into a respective pocket 23. UV-curable adhesive is then applied over the two legs 56 of the heat sink 52 that are not secured to the stator assembly 6. These two beads of adhesive are then cured to temporarily hold the subassembly 8 to the frame 2. Further heat-curable adhesive is then injected into the channels 24 of the frame 2, which act to secure the corners of stator cores 60,61 to the frame 2. The frame 2 and the subassembly 8 are then removed from the jig and placed in an oven to cure the heat-curable adhesive.

The shroud 3 is then secured to the frame 2. Again, the shroud 3 is mounted in one part of a jig and the frame 2 and subassembly 8 are mounted in another part of the jig. The jig ensures relative alignment between the shroud 3 and the rotor assembly 4, and more specifically between the shroud 4 and the impeller 41. The jig also ensures relative alignment between the holes 33 in the shroud 3 and the diffuser vanes 26 of the frame 2. The two parts of the jig are then brought together causing the shroud 3 to cover the impeller 41 and the end wall 21 of the frame 2. The outer section 32 of the shroud 3 contacts and rests on top of the diffuser vanes 26, and each projection protrudes through a respective hole 33. A ring of adhesive 34 is then applied around the shroud 3, which acts to secure the shroud 3 to the projections as well as to seal the holes 33. The adhesive is then allowed to cure in air.

Finally, the circuit assembly 7 is secured to the frame 2 and to the stator assembly 6. The circuit assembly 7 is mounted in one part of a jig and the shroud 3, frame 2 and subassembly 8 are mounted in another part of the jig. A few beads of adhesive are applied at points around the perimeter of the circuit board 70. The two parts of the jig are then brought together such that the terminal connectors 64 pass through holes in the circuit board 70, and the circuit board 70 contact the prongs 28 of the frame 2. The adhesive is then cured, and the terminal connectors 64 are soldered to the circuit board 70. The completed compressor 1 is then removed from the jig.

There are a couple of advantages associated with this method of assembly.

First, the rotor assembly 4 may be balanced as a complete unit before securing the rotor assembly 4 within the frame 2. This is made possible because the rotor assembly 4 is secured to the frame 2 by the heat sink assembly 5. Moreover, the first heat sink 51 has an outer diameter greater than that of the impeller 41, and the aperture 25 in the end wall 21 of the frame 2 has a diameter greater than the impeller 41 but smaller than the first heat sink 51. This then enables the rotor assembly 4 to be inserted and then secured with the frame 2 as a complete unit. With conventional compressors, it is often necessary to assemble the various components of the rotor assembly within the frame. Accordingly, whilst the individual components may be balanced, the completed rotor assembly is generally not.

Second, the rotor assembly 4 may be better aligned with the stator assembly 6, the diffuser 35, and the shroud 3. With a conventional compressor, the rotor assembly and the stator assembly are typically secured to the frame as separate assemblies. However, once the rotor assembly has been secured within the frame, it is generally difficult to secure the stator assembly within the frame whilst simultaneously aligning the stator assembly relative to the rotor assembly. As a result of the tolerances in the alignment of the rotor assembly and the stator assembly, a larger air gap is required between the rotor core and the stator cores in order to ensure that, at the tolerance limit, the rotor core is free to rotate without contacting the stator cores. However, a larger air gap has the disadvantage of increasing the magnetic reluctance. With the assembly method described above, the stator assembly 6 is first aligned relative to the rotor assembly 4 and then secured to the heat sink assembly 5. The subassembly 8 comprising the rotor assembly 4, the heat sink assembly 5 and the stator assembly 6 is then secured to the frame 2, during which time the rotor assembly 4 is aligned relative to the end wall 21 and the diffuser vanes 26. Since the heat sink assembly 5 is secured to both the rotor assembly 4 and the stator assembly 6, the heat sink assembly 5 maintains the relative alignment between the rotor assembly 4 and the stator assembly 6. Consequently, when the rotor assembly 4 is aligned relative to the frame 2, the alignment with the stator assembly 6 is maintained. A smaller air gap may therefore be employed between the rotor core 43 and the stator cores 60,61.

Figure 12:
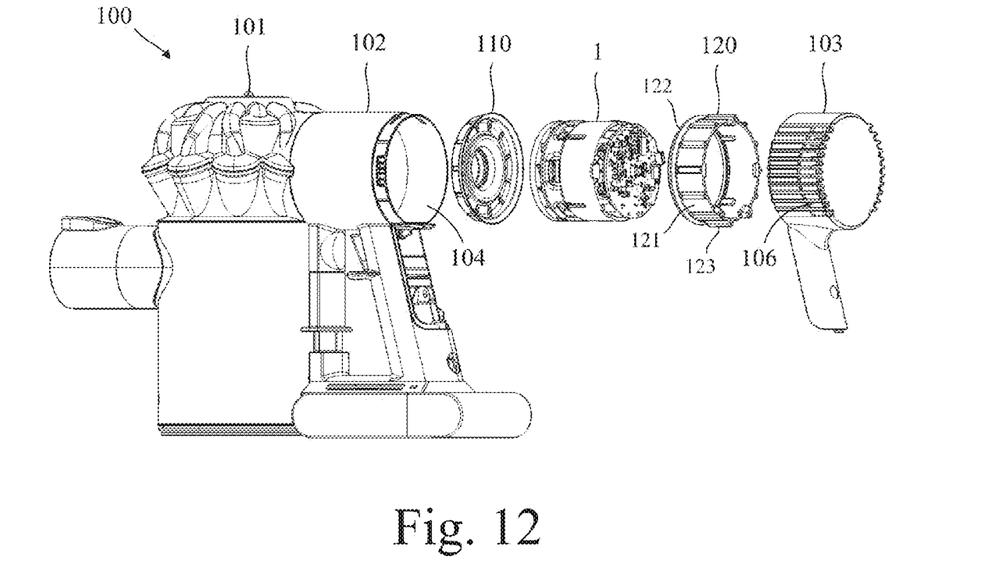
FIG. 12 is an axonometric view of a product incorporating the compressor.
Figure 13:
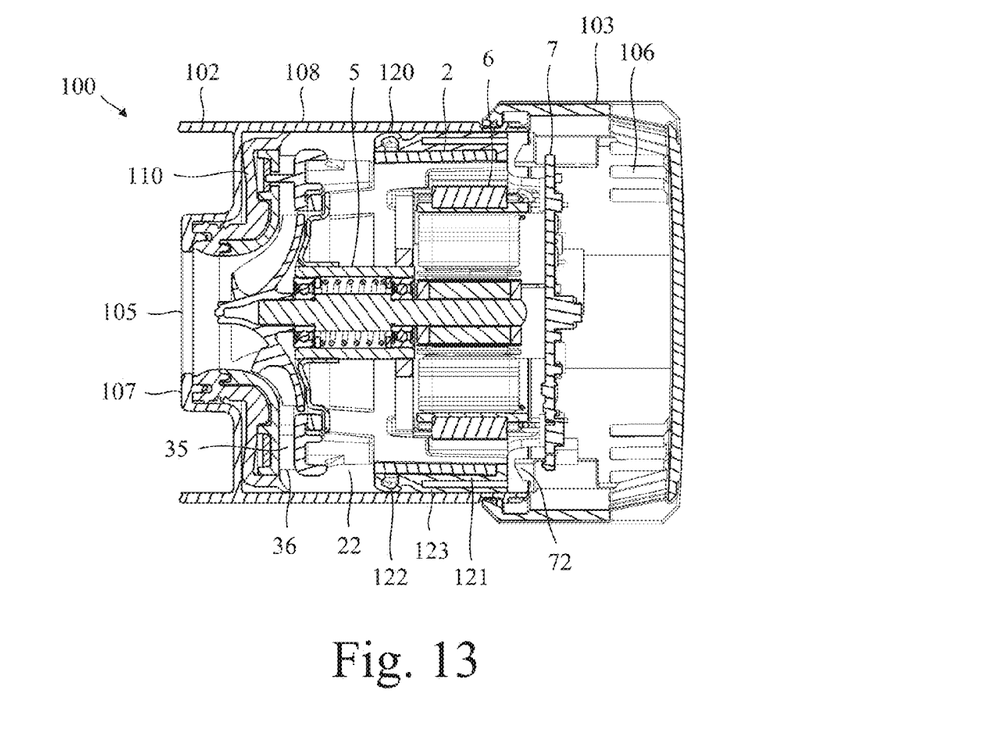
FIG. 13 is a section through part of the product housing the compressor.
Figure 14:
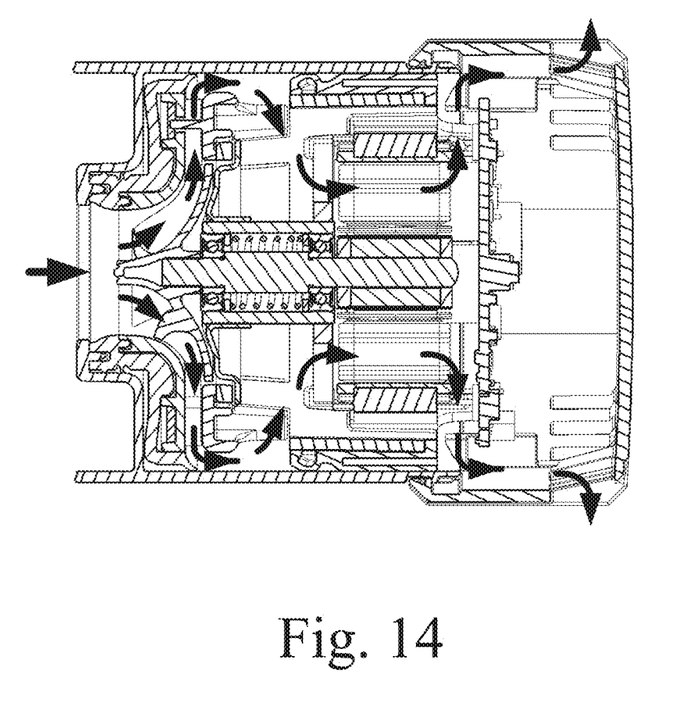
FIG. 14 is the same section as that of FIG. 13 highlighting the path taken by air flowing through the product.

Operation of the compressor 1 will now be described with reference to the product 100 illustrated in FIGS. 12 to 14, which in this particular example is a handheld vacuum cleaner.

The product 100 comprises a housing 101 within which the compressor 1 is mounted by means of an axial mount 110 and a radial mount 120. Each of the mounts 110,120 is formed of an elastomeric material and acts to isolate the housing 101 from vibration generated by the compressor 1. The axial mount 110 is similar in shape to that of the shroud 3, and is secured to the top of the shroud 3. The radial mount 120 comprises a sleeve 121, a lip seal 122 located at one end of the sleeve 121, and a plurality of axial ribs 123 that extend along and are spaced around the sleeve 121. The radial mount 120 is secured around the frame 2 of the compressor 1. More specifically, the sleeve 121 surrounds the side wall 20 of the frame 2 such that the lip seal 122 is located below the inlet apertures 22 in the side wall 2.

The housing 101 comprises a front section 102 and a rear section 103, which together define a generally cylindrical recess 104 within which the compressor 1 is mounted. The front section 102 includes an inlet 105 through which air is admitted to compressor 1, and the rear section 103 comprises a plurality of exhaust apertures 106 through which air from the compressor 1 is exhausted. The axial mount 110 abuts an end wall 107 of the front section 102 to create a seal between the compressor 1 and the inlet 105. Additionally, the radial mount 120 abuts a side wall 108 of the front section 102 such that the lip seal 122 creates a seal between the compressor 1 and the side wall 108.

During operation, air enters the compressor 1 via the shroud inlet 30. The air is centrifuged outwards by the impeller 41 and flows through the diffuser 35 defined between the frame 2 and the shroud 3. The air then exits the compressor 1 via an annular opening 36 defined by the axial gap between the frame 2 and the shroud 3 at the periphery. On exiting the compressor 1, the air re-enters the compressor 1 via the inlet apertures 22 in the side wall 20 of the frame 2. The air then flows through the interior of the compressor 1, whereupon the air acts to cool the heat sink assembly 5. The air flows radially over the first heat sink 51 and flows axially over the sleeve 50 and the second heat sink 52. The legs 56 of the second heat sink 52 extend directly into the path taken by the air flowing through the compressor 1. As a result, cooling of the second heat sink 52 is particular effective. After passing through the legs 56 of the heat sink 52, the air flows over and cools the stator assembly 6. Finally, the air is redirected in a radial direction by the circuit assembly 7, whereupon the air exits the compressor 1 via the gaps 72 between the circuit board 70 and the side wall 20 of the frame 2. In flowing over the circuit assembly 7, the air cools the electrical components 71 of the circuit assembly 7. In particular, the circuit assembly 7 comprises power switches that are used to control the flow of current through the windings 63 of the stator assembly 6. Owing to the magnitude of the currents that are carried by the switches, the switches tend to generate relatively high levels of heat.

The heat sink assembly 5 provides at least three useful functions.

First, the heat sink assembly 5 supports the rotor assembly 4 within the frame 2. In this regard, it is to be noted that the rotor assembly 2 is not secured to the frame 2 by any other means. The provision of the heat sink assembly 5 enables the rotor assembly 2 to be balanced as a complete unit before being secured to the frame 2. Moreover, the heat sink assembly 5 simplifies the assembly of the compressor 1 whilst providing relatively good support to the rotor assembly 4. In this regard, it is to be noted that the rotor assembly 4 comprises a bearing assembly 42 located between the impeller 41 and the rotor core 43. This has the advantage that a relatively short axial length may be achieved for the rotor assembly 4. Moreover, the bearing assembly 42 comprises two spaced-apart bearings 44,45. This then has the further advantage of increasing the stiffness of the rotor assembly 4 in comparison to, say, two bearings located at opposite ends of the shaft. If the heat sink assembly 5 were omitted and the rotor assembly 4 were secured directly to the frame 2, it would then be necessary to secure each of the bearings 44,45 to the frame 2. It might then prove difficult or indeed impossible to insert the rotor assembly 4 into the frame 2 as a complete unit.

The heat sink assembly 5 comprises two heat sinks 51,52 that are each secured to the frame 2. The heat sinks 51,52 are spaced axially and thus radial movement of the rotor assembly 4 relative to the frame 2 is opposed within two planes that are spaced axially. As a result, vibration of the rotor assembly 4 and the inherent noise that results are reduced.

The legs 56 of the second heat sink 52 are spaced evenly around the sleeve 50. Consequently, vibration of the rotor assembly 5 is evenly distributed among the legs 56. This then avoids excessive vibration occurring in a particular direction. The first heat sink 51 is secured to the inside of the end wall 21 of the frame 2, and the second heat sink 52 is secured within the pockets 23 of the frame 2. Accordingly, in addition to opposing radial movement, the heat sink assembly 5 opposes axial thrust generated by the impeller 41.

Second, the heat sink assembly 5 carries heat away from the bearing assembly 42. As a result, the lifespan of the bearing assembly 42 and thus the compressor 1 is prolonged. The first heat sink 51 is disc shaped and thus provides a relatively large surface area over which heat may be transferred to the surrounding air. The second heat sink 52, on the other hand, comprises a plurality of legs 56. This then enables air to flow between the legs 56 of the heat sink 52. In the present embodiment, the legs 56 extend radially into the path of the air flowing axially through the compressor 1. As a result, relatively good heat transfer is achieved between the second heat sink 52 and the surrounding air. The legs 56 of the heat sink 52 create a restriction in the flow path. The size of the restriction influences the rate at which heat transfers from the heat sink assembly 5 to the air, as well as the performance of the compressor 1 (e.g. mass flow rate and/or efficiency). The number, size and arrangement of the legs 56 are therefore chosen so as to maximise cooling without adversely affecting the performance of the compressor 1. The legs 56 are spaced evenly around the sleeve 50, which helps ensure that heat is transferred more evenly from the heat sink 52 to the surrounding air. Additionally, the width of each leg 56 tapers in a direction away from the sleeve 50. The temperature of each leg 56 and thus the rate of heat transfer decreases as one moves away from the sleeve 50. By tapering the width of the legs 56, the mass of the heat sink 52 may be reduced without adversely affecting cooling of the bearing assembly 42. As a result, a lighter and cheaper compressor 1 may be realised.

Third, the heat sink assembly 5 maintains the alignment between the rotor assembly 4 and the stator assembly 6 when securing the subassembly 8 to the frame 2. As a result, the rotor assembly 4 may be aligned within the frame 2 whilst maintaining the alignment with the stator assembly 6. Relatively good alignment may therefore be achieved between the rotor assembly 4 and the stator assembly 6, and between the rotor assembly 4 and the diffuser 35 and shroud 3.

The heat sink assembly 5 is made of steel and was selected following a balance of different requirements: structural strength, thermal conductivity, thermal expansivity and cost. Since the heat sink assembly 5 is used to secure the rotor assembly 4 within the frame 2, the structural strength of the heat sink assembly 5 is important for minimising vibration of the rotor assembly 4. The thermal conductivity of the heat sink assembly 5 is clearly important for carrying heat away from the bearing assembly 42. The bearings 44,45 are secured to the shaft 40 and the sleeve 50 of the heat sink assembly 5. Consequently, uneven thermal expansion of the shaft 40 and the sleeve 50 may cause the inner race of each bearing 44,45 to move relative to the outer race. This in turn may lead to adverse changes in the preload of the bearings 44,45. Accordingly, the thermal expansivity of the heat sink assembly 5 may play an important role in determining the lifespan of the bearing assembly 42. For this reason, it is advantageous to form the heat sink assembly 5 from a material having a coefficient of thermal expansion closely matching that of the shaft 40. Whilst steel was employed in the present embodiment, other materials may be used that fulfil the particular design requirements of the compressor 1.

Whilst a particular embodiment has thus far been described, various modifications may be made, both to the compressor and its method of assembly, without departing from the scope of the invention as defined by the claims. For example, in the embodiment described above, the heat sink assembly is described as providing three useful functions. Conceivably, the compressor may comprise a heat sink assembly that provides only one or two of these functions. For example, the compressor described above is configured such that air is drawn through the interior of the compressor and over the heat sink assembly.

Nevertheless, the heat sink assembly may be employed in a compressor for which air is not drawn through the interior and over the heat sink assembly. Moreover, whilst the heat sink assembly described above comprises two heat sinks, one or more of the aforementioned advantages may be achieved through the use of a single heat sink.

The invention claimed is:

1. A compressor comprising a housing, a rotor assembly, a stator assembly comprising one or more stator cores, and a heat sink assembly, wherein the rotor assembly comprises a shaft to which a bearing assembly and a rotor core are secured, the heat sink assembly is secured to the bearing assembly and comprises a heat sink having a plurality of legs that extend radially outward, and the stator assembly is directly secured to one or more of the legs.

2. The compressor of claim 1, wherein the rotor assembly comprises an impeller secured to the shaft, and the bearing assembly is located between the impeller and the rotor core.

3. The compressor of claim 1, wherein the bearing assembly comprises a pair of bearings, the heat sink assembly comprises a sleeve to which the heat sink is secured, and the sleeve is secured to the bearings.

4. The compressor of claim 1, wherein the stator assembly is glued to the heat sink assembly.

5. The compressor of claim 1, wherein the compressor is configured such that during use air is drawn through the interior of the compressor and passes between the legs of the heat sink.

6. A compressor comprising, a housing, a rotor assembly, a stator assembly comprising one or more stator cores, and a heat sink assembly, wherein the rotor assembly comprises a shaft to which a bearing assembly and a rotor core are secured, the bearing assembly comprises a pair of bearings, the heat sink assembly comprises a sleeve to which a heat sink is secured, the heat sink extends radially outward from the sleeve, the sleeve is secured to the bearings, wherein the heat sink comprises a plurality of legs that extend radially from the sleeve, and the stator assembly is directly secured to one or more of the legs.

7. The compressor of claim 6, wherein the rotor assembly comprises an impeller secured to the shaft, and the bearing assembly is located between the impeller and the rotor core.

8. The compressor of claim 6, wherein the stator assembly is glued to the heat sink assembly.

9. The compressor of claim 6, wherein the compressor is configured such that during use air is drawn through the interior of the compressor and flows over the sleeve and the heat sink.

10. A method of assembling a compressor, the method comprising:
providing a housing;
providing a rotor assembly comprising a shaft to which a bearing assembly and a rotor core are secured;
providing a stator assembly, wherein the stator assembly comprises one or more stator cores;
providing a heat sink assembly;
securing the heat sink assembly to the bearing assembly; and
subsequently securing the heat sink assembly directly to the stator assembly, wherein the method comprises securing the heat sink assembly to the bearing assembly and to the stator assembly to generate a collective assembly, and securing the collective assembly to a frame.

11. The method of claim 10, wherein the bearing assembly comprises a pair of bearings, the heat sink assembly comprises a sleeve and a heat sink that extends radially from the sleeve, and the method comprises securing the sleeve to the bearings and securing the heat sink to the stator assembly.

12. The method of claim 11, wherein the heat sink comprises a plurality of legs that extend radially from the sleeve, and the heat sink is secured to the stator assembly at one or more of the legs.

13. The method of claim 10, wherein securing the heat sink assembly to the stator assembly comprises gluing the heat sink assembly to the stator assembly.

14. The method of claim 10, wherein the rotor assembly comprises an impeller, the frame comprises a diffuser, and securing the collective assembly to the frame comprises aligning the impeller relative to the diffuser.

15. The method of claim 10, wherein the heat sink assembly is secured to the rotor assembly and to the stator assembly such that the stator cores are arranged around the rotor core.

16. A compressor comprising, a housing, a rotor assembly, a stator assembly comprising one or more stator cores, and a heat sink assembly, the rotor assembly comprises a shaft to which an impeller, a bearing assembly and a rotor core are secured, the bearing assembly comprises a pair of bearings, the heat sink assembly comprises a sleeve to which a heat sink is secured, wherein the bearing assembly is located between the impeller and the rotor core, the sleeve is secured to the bearing assembly, and the heat sink is secured to the stator assembly, and wherein the heat sink comprises a plurality of legs that extend radially from the sleeve, and the stator assembly is directly secured to one or more of the legs.

17. The compressor of claim 16, wherein the stator assembly is glued to the heat sink assembly.

18. A method of assembling a compressor, the method comprising:
providing a housing
providing a rotor assembly comprising a shaft to which an impeller, a bearing assembly and a rotor core are secured, the bearing assembly comprising a pair of bearings, and wherein the bearing assembly is located between the impeller and the rotor core;
providing a stator assembly, wherein the stator assembly comprises one or more stator cores;
providing a heat sink assembly comprising a sleeve to which a heat sink is secured; and
securing the sleeve to the bearing assembly and the heat sink to the stator assembly,
wherein the heat sink comprises a plurality of legs that extend radially from the sleeve, and the heat sink is directly secured to the stator assembly at one or more of the legs.

19. The method of claim 18, wherein securing the heat sink assembly to the stator assembly comprises gluing the heat sink assembly to the stator assembly.

20. The method of claim 18, wherein the method comprises securing the heat sink assembly to the bearing assembly and to the stator assembly to generate a collective assembly, and securing the collective assembly to a frame.

21. The method of claim 20, wherein the frame comprises a diffuser, and securing the collective assembly to the frame includes aligning the impeller relative to the diffuser.

22. The method of claim 18, wherein the heat sink assembly is secured to the rotor assembly and to the stator assembly such that the stator cores are arranged around the rotor core.

* * * * *